(12) United States Patent
Fukushima

(10) Patent No.: US 12,534,412 B2
(45) Date of Patent: Jan. 27, 2026

(54) CUBIC BORON NITRIDE SINTERED BODY AND COATED CUBIC BORON NITRIDE SINTERED BODY

(71) Applicant: TUNGALOY CORPORATION, Fukushima (JP)

(72) Inventor: Yuichiro Fukushima, Iwaki (JP)

(73) Assignee: TUNGALOY CORPORATION, Fukushima (JP)

(*) Notice: Subject to any disclaimer, the term of this patent is extended or adjusted under 35 U.S.C. 154(b) by 829 days.

(21) Appl. No.: 17/858,854

(22) Filed: Jul. 6, 2022

(65) Prior Publication Data

US 2023/0072845 A1    Mar. 9, 2023

(30) Foreign Application Priority Data

Aug. 24, 2021  (JP) ................ 2021-136270

(51) Int. Cl.
*C04B 35/5831* (2006.01)
*C04B 41/50* (2006.01)

(52) U.S. Cl.
CPC ...... *C04B 35/5831* (2013.01); *C04B 41/5064* (2013.01); *C04B 2235/3813* (2013.01); *C04B 2235/3856* (2013.01); *C04B 2235/386* (2013.01)

(58) Field of Classification Search
None
See application file for complete search history.

(56) References Cited

U.S. PATENT DOCUMENTS

| | | | |
|---|---|---|---|
| 4,909,973 A | 3/1990 | Nishio et al. | |
| 6,001,757 A | 12/1999 | Fukaya et al. | |
| 2003/0200844 A1* | 10/2003 | Jackson | C04B 41/5068 82/11.1 |
| 2007/0099030 A1 | 5/2007 | Dahl | |
| 2014/0165474 A1* | 6/2014 | Yee | C04B 35/6303 51/307 |
| 2016/0115087 A1 | 4/2016 | Sorai et al. | |
| 2016/0136735 A1 | 5/2016 | Matsuda et al. | |
| 2016/0297713 A1 | 10/2016 | Zhang et al. | |
| 2017/0101346 A1 | 4/2017 | Yumoto et al. | |
| 2020/0062656 A1 | 2/2020 | Can et al. | |
| 2022/0055952 A1* | 2/2022 | Nakajima | C04B 35/645 |

FOREIGN PATENT DOCUMENTS

| | | |
|---|---|---|
| CN | 101084169 A | 12/2007 |
| CN | 102765705 A | 11/2012 |
| CN | 104030690 A | 9/2014 |
| CN | 105339116 A | 2/2016 |
| CN | 113286770 A | 8/2021 |
| JP | S53-77811 A | 7/1978 |
| JP | S58-061255 A | 4/1983 |
| JP | S63-011572 A | 1/1988 |
| JP | 2643503 B2 | 8/1997 |
| JP | H10-114575 A | 5/1998 |
| JP | 2006-137623 A | 6/2006 |
| JP | 5105466 B2 | 12/2012 |
| JP | 2015-193072 A | 11/2015 |
| JP | 2020-011870 A | 1/2020 |

\* cited by examiner

*Primary Examiner* — Seth Dumbris
(74) *Attorney, Agent, or Firm* — Studebaker Brackett PLLC

(57) ABSTRACT

A cubic boron nitride sintered body including cubic boron nitride and a binder phase, wherein a content of the cubic boron nitride is 40 volume % or more and 70 volume % or less; a content of the binder phase is 30 volume % or more and 60 volume % or less; an average particle size of the cubic boron nitride is 0.1 μm or more and 3.0 μm or less; the binder phase contains TiN and/or TiCN, and $TiB_2$ and contains substantially no AlN and/or $Al_2O_3$, the binder phase has a $TiB_2$ (101) plane that shows a maximum peak position (2θ) in X-ray diffraction of 44.2° or more; and $I_2/I_1$ is 0.10 or more and 0.55 or less, where denotes an X-ray diffraction intensity of a (111) plane of the cubic boron nitride and $I_2$ denotes an X-ray diffraction intensity of a (101) plane of $TiB_2$ of the binder phase.

6 Claims, No Drawings

CUBIC BORON NITRIDE SINTERED BODY AND COATED CUBIC BORON NITRIDE SINTERED BODY

BACKGROUND OF THE INVENTION

Field of the Invention

The present invention relates to a cubic boron nitride sintered body and a coated cubic boron nitride sintered body.

Description of Related Art

A cubic boron nitride sintered body contains a cubic boron nitride (hereinafter also referred to as "cBN") and a binder phase. In general, Al is used in a part of a material of the binder phase. The reason why Al is used as a material of the binder phase is that oxidation of Al occurs with the removal of oxygen adsorbed on the surface of the raw material powder and facilitates a sintering reaction.

A conventional cubic boron nitride sintered body includes a material containing, as a binder phase material, a material containing Ti-containing compounds (hereinafter also referred to as "Ti compounds") and Al-containing compounds (hereinafter also referred to as "Al compounds"). For this reason, $Al_2O_3$, AlN, and $TiB_2$ are produced through a reaction in a conventional sintering process of a cubic boron nitride sintered body.

For example, Patent Publication JP-A-2015-193072 discloses a cubic boron nitride sintered body cutting tool, characterized by including, as a tool base, a sintered body that contains cubic boron nitride particles and a binder phase, wherein the sintered body contains 40 volume % or more and less than 60 volume % cubic boron nitride particles and contains Al in an amount with a lower limit of 2 mass % and an upper limit that satisfies the relationship of $Y=-0.1X+10$, where Y denotes an Al content (mass %) and X denotes cubic boron nitride particle content (volume %); the binder phase at least contains a Ti-based compound, $Al_2O_3$, and inevitable impurities, wherein fine particulate $Al_2O_3$ with a diameter of from 10 nm to 100 nm among the $Al_2O_3$ is dispersed and produced in the binder phase, and 30 or more particles of fine particulate $Al_2O_3$ are produced within a 1 μm×1 μm area in the section of the binder phase.

Furthermore, for example, Patent Publication JP-B-2643503 discloses a method for producing a highly tough cubic boron nitride-based ceramic material characterized by using titanium hydride powder with an average particle size of less than 1 μm and cubic boron nitride powder with an average particle size of 1 to 10 μm as raw material powder; blending these types of raw material powder in a mixing composition of from 0.5 to 20% by weight titanium hydride and the balance of cubic boron nitride, mixing them in a normal condition, molding them into a green body, then heating and holding this green body at a temperature of from 1200° C. to 1500° C. in a vacuum to react the cubic boron nitride with titanium hydride to produce titanium nitride and titanium boride, forming porous cubic boron nitride-based ceramic sintered body having a structure in which these produced titanium nitride and titanium boride are strongly coupled to cubic boron nitride, then subjecting the porous cubic boron nitride-based ceramic sintered body to an ultra-high pressure high temperature processing in a normal condition such that the theoretical density ratio be 98% or more.

Furthermore, for example, Patent Publication JP-A-S53-077811 discloses a sintered body for high hardness tools, characterized by including 80 to 20 volume % cubic boron nitride and the balance carbide, nitride, boride, or silicide of a transition metal of the group 4a, 5a, or 6a in the periodic table, or a mixture of these or a reciprocal solid solution compound containing these, wherein this mixture or compound forms a continuous binder phase in the sintered body structure.

SUMMARY

Technical Problem

High efficiency is required for recent cutting processing, and high speed, high feeding speed, and deeper cutting depth are remarkably required for the recent cutting processing. In addition, it is required in the recent cutting processing to improve the wear resistance of tools more than before.

$Al_2O_3$, which is poor in thermal conductivity, and AlN, which is poor in mechanical strength, tend to cause a decrease in the wear resistance of tools upon using a cubic boron nitride sintered body as such tools. In particular, these Al compounds greatly affect the wear resistance during high-speed cutting, during which blade edge temperature rises.

In such a background, miniaturization of Al compounds in the binder phase has been studied as for the cubic boron nitride sintered body cutting tool disclosed in Patent Publication JP-A-2015-193072, but fine particles of Al compounds are densely dispersed, and the wear resistance during high-speed processing is still insufficient. The cubic boron nitride-based ceramic material of Patent Publication JP-B-2643503 contains 80 weight % or more cubic boron nitride (it is 80 volume % or more in terms of volume %), and the wear resistance in hardened steel processing is insufficient. Furthermore, since the sintered body is porous, porous parts may be fracture origins, and the fracture resistance is insufficient. The sintered body for high hardness tools disclosed in Patent Publication JP-A-S53-077811 is formed using a cubic boron nitride and $TiN_x$ with a low nitrogen ratio. Although degassing processing at 1000° C. or more is performed before the sintering in order to remove oxygen on the cBN surface, oxides ($B_2O_3$) cannot be fully removed and remain in the form of $MB_{2+}MO$ (solid solution) in the sintered body. Furthermore, reaction wear may easily occur, and the wear resistance of the sintered body tends to be decreased because the binder phase contains nonstoichiometric compounds.

The present invention has an object to provide a cubic boron nitride sintered body capable of extending the tool life by having excellent wear resistance and fracture resistance.

Solution to Problem

The present inventor has conducted studies about the extension of tool life and has accordingly found that the wear resistance and the fracture resistance thereof can be improved if a cubic boron nitride sintered body has a specific constitution, and as a result, the tool life can be extended. Finally, the present inventor has completed the present invention based on such findings.

The gist of the present invention is as set forth below.

[1]

A cubic boron nitride sintered body comprising cubic boron nitride and a binder phase, wherein a content of the cubic boron nitride is 40 volume % or more and 70 volume % or less;

a content of the binder phase is 30 volume % or more and 60 volume % or less;
an average particle size of the cubic boron nitride is 0.1 μm or more and 3.0 μm or less;
the binder phase contains TiN and/or TiCN, and $TiB_2$ and contains substantially no AlN and/or $Al_2O_3$;
a (101) plane of $TiB_2$ in the binder phase shows a maximum peak position (2θ) in X-ray diffraction of 44.2° or more; and
$I_2/I_1$ is 0.10 or more and 0.55 or less, where $I_1$ denotes an X-ray diffraction intensity of a (111) plane of the cubic boron nitride and $I_2$ denotes an X-ray diffraction intensity of a (101) plane of $TiB_2$ of the binder phase.

[2]

The cubic boron nitride sintered body according to [1], wherein a (200) plane of Ti compounds (provided that $TiB_2$ is excluded) in the binder phase shows a maximum peak position (2θ) in X-ray diffraction of 42.1° or more.

[3]

A coated cubic boron nitride sintered body comprising the cubic boron nitride sintered body according to [1] or [2] and a coating layer formed on a surface of the cubic boron nitride sintered body.

[4]

The coated cubic boron nitride sintered body according to [3], wherein an average thickness of the entire coating layer is 0.5 μm or more and 6.0 μm or less.

Advantageous Effects of Invention

According to the present invention, a cubic boron nitride sintered body capable of extending the tool life by having excellent wear resistance and fracture resistance can be provided.

DETAILED DESCRIPTION

An embodiment for carrying out the present invention (hereinafter simply referred to as the "present embodiment") will hereinafter be described in detail. However, the present invention is not limited to the present embodiment described below. Various modifications may be made to the present invention without departing from the gist of the invention.

The cubic boron nitride sintered body according to the present embodiment is a cubic boron nitride sintered body including cubic boron nitride (hereinafter also referred to as "cBN") and a binder phase, wherein the cBN has a content of 40 volume % or more and 70 volume % or less; the binder phase has a content of 30 volume % or more and 60 volume % or less; the cBN has an average particle size of 0.1 μm or more and 3.0 μm or less; the binder phase contains TiN and/or TiCN, and $TiB_2$ and contains substantially no AlN and/or $Al_2O_3$, the binder phase has a $TiB_2$ (101) plane that shows a maximum peak position (2θ) in X-ray diffraction of 44.2° or more; and $I_2/I_1$ is 0.10 or more and 0.55 or less, where $I_1$ denotes an X-ray diffraction intensity of a (111) plane of the cubic boron nitride and $I_2$ denotes an X-ray diffraction intensity of a (101) plane of $TiB_2$ of the binder phase.

The cubic boron nitride sintered body according to the present embodiment with such a constitution can improve the wear resistance and fracture resistance and, as a result, can extend the tool life.

The detailed reason why the cubic boron nitride sintered body according to the present embodiment provides a tool with an extended tool life, improved wear resistance, and improved fracture resistance is not clear, but the present inventor considers the reason as follows. However, the reason is not limited thereto. That is, since the cBN content is 40 volume % or more in the cubic boron nitride sintered body according to the present embodiment, the proportion of the binder phase is relatively low, and therefore, mechanical strength is improved and the fracture resistance is excellent. Meanwhile, since the cBN content is 70 volume % or less in the cubic boron nitride sintered body according to the present embodiment, the reaction resistance to iron becomes good and the wear resistance is excellent. Furthermore, since the average particle size of the cBN is 0.1 μm or more in the cubic boron nitride sintered body according to the present embodiment, the thermal conductivity becomes high, and the heat tends to be radiated during cutting and the reaction wear resistance is excellent. Meanwhile, since the average particle size of the cBN is 3.0 μm or less in the cubic boron nitride sintered body according to the present embodiment, the thickness of the binder phase becomes small and therefore, the mechanical strength is improved and the fracture resistance is excellent. Since the binder phase contains TiN and/or TiCN, and $TiB_2$ and contains substantially no $Al_2O_3$, which shows poor thermal conductivity, and/or AlN, which shows poor mechanical strength, the cubic boron nitride sintered body according to the present embodiment is excellent in wear resistance. In addition, since the maximum peak position (2θ) in X-ray diffraction of a (101) plane of $TiB_2$ in the binder phase is 44.2° or more in the cubic boron nitride sintered body according to the present embodiment, Ti oxides are not dissolved as solid in $TiB_2$ and the binder phase contains no nonstoichiometric compound. Thus, the cubic boron nitride sintered body according to the present embodiment is excellent in wear resistance due to the chemical reaction between a work material and a sintered body. Since the $I_2/I_1$ is 0.10 or more in the cubic boron nitride sintered body according to the present embodiment, cBN and the binder phase are sufficiently reacted by the sintering. Thus, the fracture resistance is excellent because the strength of the sintered body is improved. Meanwhile, since the $I_2/I_1$ is 0.55 or less in the cubic boron nitride sintered body according to the present embodiment, the proportion of the $TiB_2$ is small, and therefore, the mechanical strength is improved and the fracture resistance is excellent. A cubic boron nitride sintered body according to the present embodiment can provide a tool with an extended life, improved wear resistance, and improved fracture resistance due to these effects combined together.

The cubic boron nitride sintered body according to the present embodiment includes cBN and a binder phase. The cBN content is 40 volume % or more and 70 volume % or less. The content of the binder phase is 30 volume % or more and 60 volume % or less. The total content of the cBN and the binder phase is 100 volume % in the cubic boron nitride sintered body according to the present embodiment.

Since the cBN content is 40 volume % or more in the cubic boron nitride sintered body according to the present embodiment, the proportion of the binder phase is relatively low, and therefore, mechanical strength is improved and the fracture resistance is excellent. Meanwhile, since the cBN content is 70 volume % or less in the cubic boron nitride sintered body according to the present embodiment, the reaction resistance to iron becomes good and the wear resistance is excellent. From a similar point of view, the cBN content preferably ranges 45 volume % or more and 70 volume % or less and more preferably ranges 52 volume % or more and 67 volume % or less.

In the cubic boron nitride sintered body according to the present embodiment, the cBN content and the binder phase content (volume %) can be determined by photographing an arbitrary cross-section with a scanning electron microscope (SEM) and analyzing the photographed SEM photograph using commercially available image analysis software. Specifically, the content can be determined by a method disclosed in the Examples described below.

The average particle size of the cBN in the cubic boron nitride sintered body according to the present embodiment is 0.1 μm or more and 3.0 μm or less. Since the average particle size of the cBN is 0.1 μm or more in the cubic boron nitride sintered body according to the present embodiment, the thermal conductivity is high and the heat can be easily radiated during cutting, and therefore, the reaction wear resistance is excellent. Meanwhile, since the average particle size of the cBN is 3.0 μm or less in the cubic boron nitride sintered body according to the present embodiment, the thickness of the binder phase becomes small, and therefore, the mechanical strength is improved and the fracture resistance is excellent. From a similar point of view, the average particle size of the cBN is preferably 0.3 μm or more and 3.0 μm or less.

In the present embodiment, the average particle size of the cBN is determined, for example, in the following manner.

The sectional structure of the cubic boron nitride sintered body is photographed using a SEM. The area of a cBN particle in the photographed sectional structure is determined, and then the diameter of a circle with an area equal to the area of a cBN particle is determined as the particle size of the cBN. The average of a plurality of cBN particles is determined as the average particle size of the cBN. The average particle size of the cBN can be determined using commercially available image analysis software from an image of a sectional structure of the cubic boron nitride sintered body. Specifically, the content can be determined by a method disclosed in the Examples described below.

In the cubic boron nitride sintered body according to the present embodiment, the binder phase contains TiN and/or TiCN, and $TiB_2$ and contains substantially no AlN and/or $Al_2O_3$. Since the binder phase contains TiN and/or TiCN, and $TiB_2$ and contains substantially no $Al_2O_3$, which shows poor thermal conductivity, and/or AlN, which shows poor mechanical strength, the cubic boron nitride sintered body according to the present embodiment is excellent in wear resistance.

In the present embodiment, the wording "the binder phase contains substantially no AlN and/or $Al_2O_3$" means that AlN and/or $Al_2O_3$ are/is not detected in an X-ray diffraction measurement of the binder phase.

In the cubic boron nitride sintered body according to the present embodiment, the binder phase preferably consists of TiN and/or TiCN, and $TiB_2$, and more preferably consists of TiN and $TiB_2$. When the binder phase consists of such Ti compounds, the cubic boron nitride sintered body according to the present embodiment tends to show excellent reaction resistance with iron-based work materials (for example, hardened steels) and much better wear resistance. Furthermore, when the Ti compounds contain $TiB_2$, the cubic boron nitride and the binder phase are sufficiently reacted, and the fracture resistance tends to be higher. It is preferable that the binder phase contains substantially no TiC when the cubic boron nitride sintered body according to the present embodiment is used in the cutting processing of hardened steel. The cubic boron nitride sintered body according to the present embodiment shows excellent reaction resistance with hardened steel when the binder phase contains substantially no TiC, and tends to show much better wear resistance when used in cutting processing of hardened steels.

In the present embodiment, the wording "the binder phase contains substantially no TiC" means that TiC is not detected in an X-ray diffraction measurement of the binder phase.

In the cubic boron nitride sintered body according to the present embodiment, the respective contents (volume %) of the cubic boron nitride and the binder phase can be determined by analyzing, using commercially available image analysis software, a structural photograph of the cubic boron nitride sintered body taken by a scanning electron microscope (SEM). More specifically, the cubic boron nitride sintered body is mirror-polished in a direction orthogonal to a surface thereof. Next, using a SEM, an observation is conducted on a backscattered electron image of the mirror-polished surface of the cubic boron nitride sintered body exposed via the mirror polishing. At this time, the mirror-polished surface of the cubic boron nitride sintered body, magnified from 5,000 to 20,000 times using the SEM, is observed via a backscattered electron image. Using an energy-dispersive X-ray spectroscope (EDS) included with the SEM, it can be determined that a black region is identified as cubic boron nitride, and a gray region and a white region are each identified as a binder phase. Thereafter, a structural photograph of the above cross section of the cubic boron nitride is taken using a SEM. With commercially available image analysis software, the respective occupied areas of the cubic boron nitride and the binder phase are obtained from the obtained structural photograph, and the contents (volume %) are obtained from the occupied areas.

Herein, the mirror-polished surface of the cubic boron nitride sintered body is a cross section of the cubic boron nitride sintered body obtained by mirror-polishing the surface of the cubic boron nitride sintered body or an arbitrary cross-section thereof. Examples of a method for obtaining a mirror-polished surface of a cubic boron nitride sintered body include a polishing method using diamond paste.

The composition of a binder phase can be identified using a commercially available X-ray diffractometer. For example, when an X-ray diffraction measurement is performed, using an X-ray diffractometer (product name "RINT TTR III") manufactured by Rigaku Corporation, by means of a 2θ/θ focusing optical system with Cu-Kα radiation under the following conditions, the composition of the binder phase can be identified. Here, the measurement conditions may be as follow:

Output: 50 kV, 250 mA,
Incident-side Soller slit: 5°,
Divergence vertical slit: ½°,
Divergence vertical restriction slit: 10 mm,
Scattering slit ⅔°,
Light-receiving side Soller slit: 5°,
Light reception slit: 0.15 mm,
BENT monochromator,
Light-receiving monochrome slit: 0.8 mm
Sampling width: 0.02°,
Scan speed: 1°/min
2θ measurement range: 30° to 90°.

In the present embodiment, the cubic boron nitride content and the binder phase content, and the binder phase composition can be determined by the methods described in the Examples mentioned below.

In the cubic boron nitride sintered body according to the present embodiment, the maximum peak position (2θ) in X-ray diffraction of the (101) plane of $TiB_2$ in the binder phase is 44.2° or more. Since the maximum peak position (2θ) in X-ray diffraction of a (101) plane of $TiB_2$ in the binder phase is 44.2° or more in the cubic boron nitride sintered body according to the present embodiment, Ti oxides are not dissolved as solid in $TiB_2$ and the binder phase contains no nonstoichiometric compound. Thus, the cubic boron nitride sintered body according to the present embodiment shows excellent wear resistance due to the chemical reaction between a work material and a sintered body. From a similar point of view, the maximum peak position (2θ) in X-ray diffraction of a (101) plane of $TiB_2$ in the binder phase is preferably 44.2° or more and 44.6° or less and more preferably 44.3° or more and 44.5° or less.

The cubic boron nitride sintered body according to the present embodiment shows a ratio $I_2/I_1$ of 0.10 or more and 0.55 or less, where $I_1$ denotes an X-ray diffraction intensity of a (111) plane of the cubic boron nitride and $I_2$ denotes an X-ray diffraction intensity of a (101) plane of $TiB_2$ of the binder phase. Since the $I_2/I_1$ is 0.10 or more in the cubic boron nitride sintered body according to the present embodiment, cBN and the binder phase are sufficiently reacted by the sintering. Thus, the fracture resistance is excellent because the strength of the sintered body is improved. Meanwhile, since the $I_2/I_1$ is 0.55 or less in the cubic boron nitride sintered body according to the present embodiment, the proportion of the $TiB_2$ is small, and therefore, the mechanical strength is improved and the fracture resistance is excellent. From a similar point of view, $I_2/I_1$ is preferably 0.11 or more and 0.54 or less, and more preferably 0.12 or more and 0.53 or less.

In the cubic boron nitride sintered body according to the present embodiment, the maximum peak position (2θ) in X-ray diffraction of the (200) plane of Ti compounds (provided that $TiB_2$ is excluded) in the binder phase is 42.1° or more. The cubic boron nitride sintered body according to the present embodiment showing a maximum peak position (2θ) in X-ray diffraction of the (200) plane of Ti compounds (provided that $TiB_2$ is excluded) in the binder phase of 42.1° or more contains no TiC, which is poor in reaction resistance with iron-based materials, and thus shows much better reaction resistance. From a similar point of view, the maximum peak position (2θ) in X-ray diffraction of a (200) plane of Ti compounds (provided that $TiB_2$ is excluded) in the binder phase is preferably 42.1° or more and 42.7° or less.

In the present embodiment, the X-ray diffraction intensity of each compound in the cubic boron nitride and a binder phase can be identified using a commercially available X-ray diffractometer. For example, the X-ray diffraction intensity can be measured using an X-ray diffractometer (product name "RINT TTR III") manufactured by Rigaku Corporation. An example of the measurement condition is as follows.

X-ray diffraction measurement of a 2θ/θ centralized optical system using a Cu-Kα ray
  Output: 50 kV, 250 mA,
  Incident-side Soller slit: 5°
  Divergence vertical slit: ½°
  Divergence vertical restriction slit: 10 mm
  Scattering slit: ⅔°
  Light-receiving side Soller slit: 5°
  Light-receiving slit: 0.15 mm
  BENT monochromator
  Light-receiving monochrome slit: 0.8 mm
  Sampling width: 0.02°
  Scan speed: 2°/min
  2θ measurement range: 30° to 55°.

The cubic boron nitride sintered body according to the present embodiment is preferably nonporous. The cubic boron nitride sintered body according to the present embodiment tends to show much better fracture resistance when it is nonporous because pores, which can be fracture origins, do not exist.

The cubic boron nitride sintered body according to the present embodiment may inevitably include impurities. Non-limiting examples of impurities include lithium included in raw material powder. The content of the inevitable impurities is normally 1 mass % or less in relation to the entire cubic boron nitride sintered body. Accordingly, inevitable impurities hardly affect the characteristic values of the cubic boron nitride sintered body.

The coated cubic boron nitride sintered body according to the present embodiment includes the cubic boron nitride sintered body mentioned above and a coating layer formed on a surface of the cubic boron nitride sintered body.

The coating layer formed on a surface of the cubic boron nitride sintered body further improves the wear resistance of the cubic boron nitride sintered body. The coating layer preferably includes an element of at least one element selected from the group consisting of Ti, Zr, Hf, V, Nb, Ta, Cr, Mo, W, Al, and Si and an element of at least one selected from the group consisting of C, N, O, and B. The coating layer may have a single-layer structure or a laminated structure including two or more layers. When the coating layer has such structures, the coated cubic boron nitride sintered body according to the present embodiment shows further improved wear resistance.

Non-limiting examples of compounds forming the coating layer include TiN, TiC, TiCN, TiAlN, TiSiN, CrAlN, and the like. The coating layer may have a structure in which multiple layers, each having a different composition, are laminated in an alternating manner. In this case, the average thickness of each layer is, for example, 5 nm or more and 500 nm or less.

The average thickness of the entire coating layer is preferably 0.5 μm or more and 6.0 μm or less. The coated cubic boron nitride sintered body of the present embodiment tends to show improved wear resistance when the average thickness of the entire coating layer is 0.5 μm or more. In contrast, the coated cubic boron nitride sintered body tends to suppress the occurrence of fractures due to peeling when the average thickness of the entire coating layer is 6.0 μm or less. From a similar point of view, the average thickness of the entire coating layer is preferably 1.0 μm or more and 5.5 μm or less and more preferably 1.0 μm or more and 5.0 μm or less.

The thickness of each layer that constitutes the coating layer and the thickness of the entire coating layer can be measured from a cross-sectional structure of the coated cubic boron nitride sintered body using an optical microscope, a SEM, a transmission electron microscope (TEM), or the like. It should be noted that, as to the average thickness of each layer and the average thickness of the entire coating layer in the coated cubic boron nitride sintered body, such average thicknesses can be obtained by measuring, near the position 50 μm from the edge of a surface facing the metal evaporation source toward the center of such surface, the thickness of each layer and the thickness of the entire coating layer from each of the cross sections at three or more locations, and calculating the average value thereof.

The composition of each layer that constitutes the coating layer can be measured from a cross-sectional structure of the coated cubic boron nitride sintered body using an EDS, a wavelength-dispersive X-ray spectroscope (WDS), or the like.

A method of manufacturing a coating layer in a coated cubic boron nitride sintered body according to the present embodiment is not particularly limited, and examples of such methods include chemical deposition methods and physical vapor deposition methods, such as an ion plating method, an arc ion plating method, a sputtering method, and an ion mixing method. Among them, arc ion plating methods are still preferred because further better adhesiveness between the coating layer and the cubic boron nitride sintered body can be provided.

The cubic boron nitride sintered body or the coated cubic boron nitride sintered body according to the present embodiment show excellent wear resistance and fracture resistance, and is therefore preferably used as cutting tools and wear-resistant tools, and among them, is preferably used as cutting tools. The cubic boron nitride sintered body or the coated cubic boron nitride sintered body according to the present embodiment is further preferably used as cutting tools for sintered metals or cast iron. The tool life can be extended compared to conventional tools when the cubic boron nitride sintered body or the coated cubic boron nitride sintered body according to the present embodiment is used as cutting tools or wear-resistant tools.

The cubic boron nitride sintered body according to the present embodiment is manufactured, for example, in the following manner.

As raw material powder, cBN powder, TiN powder, $TiN_{0.8}$ powder, $Ti(CN)_{0.8}$ powder, $TiC_{0.8}$ powder, $TiB_2$ powder, and Al powder are prepared. Here, the average particle size of the cBN in an obtained cubic boron nitride sintered body can be controlled within the above specific range by appropriately adjusting the average particle size of the raw material cBN powder. In addition, the contents of the cBN and the binder phase in an obtained cubic boron nitride sintered body can be controlled within the above specific ranges by appropriately adjusting the proportion of each raw material powder. Next, the prepared raw material powder is put in a ball mill cylinder together with cemented carbide balls, a solvent, and paraffin, and then mixed. The raw material powder mixed with ball mills is subjected to hydrogen reduction processing in the following condition, for example.

Hydrogen Reduction Processing Condition
Atmosphere: in the hydrogen gas air flow
Processing temperature: 600° C. to 900° C.
Processing time: 0.5 to 2 hours Hydrogen reduction processing removes oxygens on the raw material powder surface, and therefore can suppress the oxide production in a sintered body. In addition, although fine cBN powder typically has a large surface and contains a large amount of oxides and is hard to sinter, hydrogen reduction processing allows the use of the powder. In the present embodiment, a method for removing oxygens on the raw material powder surface is not limited to hydrogen reduction processing, and other known methods can be used.

A high-melting-point metal capsule made of Zr is filled with the hydrogen-reduced raw material powder under a nitrogen atmosphere in a glove box, the capsule is then sealed, and the raw material powder filled in the capsule is sintered at high pressure. For example, the condition of high-pressure sintering is a pressure of 4.0 to 7.0 GPa, a temperature of 1200° C. to 1500° C., and a sintering time of 20 to 60 minutes.

Methods for controlling $I_2/I_1$, where $I_1$ denotes an X-ray diffraction intensity of a (111) plane of the cubic boron nitride and $I_2$ denotes an X-ray diffraction intensity of a (101) plane of $TiB_2$ of the binder phase, to the above specific range are not particularly limited, and, for example, a method for appropriately adjusting the type or the blending proportion of raw material powder or a method for appropriately adjusting the temperature during sintering raw material powder can be mentioned. In particular, $I_2/I_1$ tends to be larger when $TiN_{0.8}$ powder and/or $Ti(CN)_{0.8}$ powder are used as raw material powder with increased blending proportions of the $TiN_{0.8}$ powder and/or $Ti(CN)_{0.8}$ powder. In addition, for example, $I_2/I_1$ tends to be larger when $TiB_2$ is mixed as raw material powder. In addition, for example, $I_2/I_1$ tends to be larger when the temperature during sintering the raw material powder is raised.

Methods for controlling the maximum peak position (2θ) in X-ray diffraction of a (101) plane of $TiB_2$ in the binder phase to the above specific range is not particularly limited, and for example, a method for subjecting the mixed raw material powder to hydrogen reduction processing in the above specific condition. Specifically, hydrogen reduction processing of the mixed raw material powder performed in the above specific condition suppresses the dissolution of Ti oxides as solid in the $TiB_2$, and the maximum peak position (2θ) in X-ray diffraction of a (101) plane of $TiB_2$ in the binder phase tends to be high.

Methods for controlling the maximum peak position (2θ) in X-ray diffraction of a (200) plane of Ti compounds (provided that $TiB_2$ is excluded) in the binder phase to the above specific range are not particularly limited, and for example, a method for appropriately adjusting the type or the blending proportion of raw material powder can be mentioned. Specifically, the maximum peak position (2θ) in X-ray diffraction of a (200) plane of Ti compounds (provided that $TiB_2$ is excluded) in the binder phase tends to be high when TiN powder and $TiN_{0.8}$ powder are used as raw material powder, and the maximum peak position (2θ) in X-ray diffraction of a (200) plane of Ti compounds (provided that $TiB_2$ is excluded) in the binder phase tends to be low when $Ti(CN)_{0.8}$ powder is used as raw material powder. The maximum peak position (2θ) in X-ray diffraction of a (200) plane of Ti compounds (provided that $TiB_2$ is excluded) in the binder phase tends to be further lower when TiC powder is used as raw material powder.

A cutting tool or a wear-resistant tool including the cubic boron nitride sintered body can be manufactured by processing the cubic boron nitride sintered body according to the present embodiment with a laser cutting machine into a predetermined shape.

EXAMPLES

Although the present invention will be described in further detail below with examples, the present invention is not limited to such examples.

Example 1

Preparation of Raw Material Powder

Cubic boron nitride (hereinafter also referred to as an "cBN") powder, TiN powder, $TiN_{0.8}$ powder, $Ti(CN)_{0.8}$ powder, $TiC_{0.8}$ powder, $TiB_2$ powder, and Al powder were mixed in the proportion listed in the following Table 1. The average particle size of the cBN powder was as listed in Table 1. The average particle size of the TiN powder, the $TiN_{0.8}$ powder, the $Ti(CN)_{0.8}$ powder, the $TiC_{0.8}$ powder, and the $TiB_2$ powder were each 1.0 μm. The average particle size of the Al powder was 0.5 μm. The average particle size of the raw material powder was measured in accordance with the Fisher process (Fisher Sub-Sieve Sizer (FSSS)) disclosed in the American Society for Testing Materials (ASTM) standard B330.

TABLE 1

| Sample number | Mixing composition (volume %) | | | | | | | Average particle size of cBN (μm) |
|---|---|---|---|---|---|---|---|---|
| | cBN | TiN | $TiN_{0.8}$ | $Ti(CN)_{0.8}$ | $TiC_{0.8}$ | $TiB_2$ | Al | |
| Invention sample 1 | 55 | 0 | 45 | 0 | 0 | 0 | 0 | 1.5 |
| Invention sample 2 | 45 | 0 | 55 | 0 | 0 | 0 | 0 | 1.5 |
| Invention sample 3 | 70 | 0 | 30 | 0 | 0 | 0 | 0 | 1.5 |
| Invention sample 4 | 55 | 0 | 45 | 0 | 0 | 0 | 0 | 0.3 |
| Invention sample 5 | 55 | 0 | 45 | 0 | 0 | 0 | 0 | 3.0 |
| Invention sample 6 | 55 | 0 | 40 | 0 | 0 | 5 | 0 | 1.5 |
| Invention sample 7 | 55 | 20 | 25 | 0 | 0 | 0 | 0 | 1.5 |
| Invention sample 8 | 55 | 0 | 0 | 45 | 0 | 0 | 0 | 1.5 |
| Invention sample 9 | 50 | 0 | 50 | 0 | 0 | 0 | 0 | 1.5 |
| Invention sample 10 | 65 | 0 | 35 | 0 | 0 | 0 | 0 | 1.5 |
| Comparative sample 1 | 38 | 0 | 62 | 0 | 0 | 0 | 0 | 1.5 |
| Comparative sample 2 | 76 | 0 | 24 | 0 | 0 | 0 | 0 | 1.5 |
| Comparative sample 3 | 55 | 0 | 45 | 0 | 0 | 0 | 0 | 0.1 |
| Comparative sample 4 | 55 | 0 | 45 | 0 | 0 | 0 | 0 | 5.0 |
| Comparative sample 5 | 55 | 42 | 0 | 0 | 0 | 0 | 3 | 1.5 |
| Comparative sample 6 | 55 | 35 | 0 | 0 | 0 | 0 | 10 | 1.5 |
| Comparative sample 7 | 55 | 0 | 35 | 0 | 0 | 0 | 10 | 1.5 |
| Comparative sample 8 | 55 | 0 | 45 | 0 | 0 | 0 | 0 | 1.5 |
| Comparative sample 9 | 55 | 45 | 0 | 0 | 0 | 0 | 0 | 1.5 |
| Comparative sample 10 | 55 | 0 | 0 | 0 | 45 | 0 | 0 | 1.5 |

Mixing Raw Material Powder

Raw material powder was put in a ball mill cylinder together with cemented carbide balls and paraffin, and then further mixed. The raw material powder mixed with ball mills was subjected to hydrogen reduction processing in the following condition. Note that comparative samples 8 was not subjected to hydrogen reduction processing.

Hydrogen Reduction Processing Condition
Atmosphere: in the hydrogen gas air flow
Processing temperature: 800° C.
Processing time: 1 hour A high-melting-point metal capsule made of Zr was filled with the hydrogen-reduced raw material powder (alternatively, the mixed raw material powder in the case where the hydrogen reduction processing was not performed) under a nitrogen atmosphere in a glove box, and the capsule was then sealed. Note that, as to comparative sample 8, a high-melting-point metal capsule made of Zr was filled with the mixed raw material powder in the atmosphere, and the capsule was then sealed.

High-Pressure Sintering

After that, the raw material powder filled in the capsule was sintered at high pressure. The following Table 2 shows the condition of the high-pressure sintering.

TABLE 2

| | Sintering condition | | |
|---|---|---|---|
| Sample number | Temperature (° C.) | Pressure (GPa) | Time (min.) |
| Invention sample 1 | 1350 | 5 | 30 |
| Invention sample 2 | 1350 | 5 | 30 |
| Invention sample 3 | 1450 | 5 | 30 |
| Invention sample 4 | 1400 | 5 | 30 |
| Invention sample 5 | 1300 | 5 | 30 |
| Invention sample 6 | 1350 | 5 | 30 |
| Invention sample 7 | 1350 | 5 | 30 |
| Invention sample 8 | 1350 | 5 | 30 |
| Invention sample 9 | 1350 | 5 | 30 |
| Invention sample 10 | 1400 | 5 | 30 |
| Comparative sample 1 | 1350 | 5 | 30 |
| Comparative sample 2 | 1450 | 5 | 30 |
| Comparative sample 3 | 1350 | 5 | 30 |
| Comparative sample 4 | 1350 | 5 | 30 |
| Comparative sample 5 | 1350 | 5 | 30 |
| Comparative sample 6 | 1350 | 5 | 30 |
| Comparative sample 7 | 1350 | 5 | 30 |
| Comparative sample 8 | 1350 | 5 | 30 |
| Comparative sample 9 | 1350 | 5 | 30 |
| Comparative sample 10 | 1350 | 5 | 30 |

Analysis of SEM Image

The contents (volume %) of the cubic boron nitride and the binder phase in the cubic boron nitride sintered body obtained by high-pressure sintering was determined by analyzing a structural photograph of the cubic boron nitride sintered body, which had been taken by a scanning electron microscope (SEM), using commercially available image analysis software. More specifically, the cubic boron nitride sintered body was mirror-polished in a direction orthogonal to a surface thereof. Next, a backscattered electron image of the mirror-polished surface of the cubic boron nitride sintered body exposed via the mirror polishing was observed using a SEM. At this time, the mirror-polished surface of the cubic boron nitride sintered body was observed using the SEM via a backscattered electron image at a magnification selected within a range from 1000 to 10000 times such that 200 or more cubic boron nitride particles could be covered. Using an energy-dispersive X-ray spectroscope (EDS) included with the SEM, a black region was identified as cubic boron nitride, and gray and white regions were identified as binder phases. Thereafter, a structural photograph of the above cross section of the cubic boron nitride was taken using the SEM. With commercially available image analysis software, the respective occupied areas of the cubic boron nitride and the binder phase were determined from the obtained structural photograph, and the contents (volume %) were determined from the occupied areas.

Here, a cross section of the cubic boron nitride sintered body obtained by mirror-polishing the surface of the cubic boron nitride sintered body or an arbitrary cross-section thereof was set as the mirror-polished surface of the cubic boron nitride sintered body. Polishing using diamond paste was adopted as the method for obtaining a mirror-polished surface of a cubic boron nitride sintered body.

The composition of the binder phase was identified using an X-ray diffractometer (product name "RINT TTR III") manufactured by Rigaku Corporation. Specifically, an X-ray diffraction measurement of a 2θ/θ focusing optical system using Cu-Kα ray was performed in the following condition to identify the composition of the binder phase.

Output: 50 kV, 250 mA,
Incident-side Soller slit: 5°,
Divergence vertical slit: ½°,
Divergence vertical restriction slit: 10 mm,
Scattering slit: ⅔°,
Light-receiving side Soller slit: 5°,
Light reception slit: 0.15 mm,
BENT monochromator,
Light-receiving monochrome slit: 0.8 mm
Sampling width: 0.02°,
Scan speed: 1°/min
2θ measurement range: 30° to 90°.

In addition, the area of a cBN particle in the photographed sectional structure was determined by image-analyzing the structural photograph of the cubic boron nitride sintered body taken by a SEM, and the diameter of a circle with an area equal to the area of a cBN particle determined above was set as the particle size of the cBN. The average of cBN particles existing in the structural photograph was determined as the average particle size of the cBN. Table 3 shows these measurement results.

Analysis by X-ray Diffraction (XRD)

Ti compounds and Al compounds included in the cubic boron nitride sintered body obtained by high-pressure sintering were analyzed by X-ray diffraction (XRD). Specifically, the Ti compound was identified as TiC when the maximum peak position of a (200) plane of Ti compounds by XRD was 41.7° or more and less than 42.1°, as TiCN when the peak position was 42.1° or more and less than 42.4°, and as TiN when the peak position was 42.4° or more and 42.8° or less. The following Table 3 shows the analysis results of Ti compounds and Al compounds by XRD.

The maximum peak position (2θ) in X-ray diffraction of a (101) plane of $TiB_2$ and the maximum peak position (2θ) in X-ray diffraction of a (200) plane of Ti compounds (provided that $TiB_2$ was excluded) were determined from the obtained X-ray diffraction pattern. In addition, the X-ray diffraction intensity of the (111) plane of cBN, $I_1$, and the X-ray diffraction intensity of the (101) plane of $TiB_2$, $I_2$, were determined, and then the ratio thereof ($I_2/I_1$) was calculated from the obtained X-ray diffraction pattern. The X-ray diffraction intensity was determined based on the peak heights. The following Table 4 shows these results.

The XRD measurement was performed, using an X-ray diffractometer (product name "RINT TTR III") manufactured by Rigaku Corporation, by means of a 2θ/θ focusing optical system with Cu-Kα ray. The measurement condition was as follows.

Output: 50 kV, 250 mA,
Incident-side Soller slit: 5°
Divergence vertical slit: ½°
Divergence vertical restriction slit: 10 mm
Scattering slit: ⅔°
Light-receiving side Soller slit: 5°
Light-receiving slit: 0.15 mm
BENT monochromator
Light-receiving monochrome slit: 0.8 mm
Sampling width: 0.02°
Scan speed: 2°/min
2θ measurement range: 30° to 55°.

TABLE 3

| | Cubic boron nitride sintered body | | | | |
|---|---|---|---|---|---|
| | | Binder phase | | | Average |
| Sample number | cBN (volume %) | Composition | (volume %) | Al compound content (volume %) | particle size of cBN (μm) |
| Invention sample 1 | 53 | TiN, $TiB_2$ | 47 | 0 | 1.4 |
| Invention sample 2 | 43 | TiN, $TiB_2$ | 57 | 0 | 1.4 |
| Invention sample 3 | 67 | TiN, $TiB_2$ | 33 | 0 | 1.5 |
| Invention sample 4 | 52 | TiN, $TiB_2$ | 48 | 0 | 0.3 |
| Invention sample 5 | 54 | TiN, $TiB_2$ | 46 | 0 | 2.8 |
| Invention sample 6 | 53 | TiN, $TiB_2$ | 47 | 0 | 1.3 |
| Invention sample 7 | 54 | TiN, $TiB_2$ | 46 | 0 | 1.5 |
| Invention sample 8 | 53 | TiCN, $TiB_2$ | 47 | 0 | 1.5 |
| Invention sample 9 | 58 | TiN, $TiB_2$ | 42 | 0 | 1.4 |
| Invention sample 10 | 61 | TiN, $TiB_2$ | 39 | 0 | 1.4 |
| Comparative sample 1 | 36 | TiN, $TiB_2$ | 64 | 0 | 1.3 |
| Comparative sample 2 | 73 | TiN, $TiB_2$ | 27 | 0 | 1.5 |
| Comparative sample 3 | 51 | TiN, $TiB_2$ | 49 | 0 | 0.05 |
| Comparative sample 4 | 54 | TiN, $TiB_2$ | 46 | 0 | 4.7 |
| Comparative sample 5 | 53 | TiN, $TiB_2$, AlN, $Al_2O_3$ | 47 | 4 | 1.4 |
| Comparative sample 6 | 52 | TiN, $TiB_2$, AlN | 48 | 11 | 1.4 |
| Comparative sample 7 | 50 | TiN, $TiB_2$, AlN, $Al_2O_3$ | 50 | 12 | 1.5 |

TABLE 3-continued

| | Cubic boron nitride sintered body | | | | |
|---|---|---|---|---|---|
| | | Binder phase | | | Average |
| Sample number | cBN (volume %) | Composition | (volume %) | Al compound content (volume %) | particle size of cBN (μm) |
| Comparative sample 8 | 53 | TiN, TiB₂ | 47 | 0 | 1.4 |
| Comparative sample 9 | 54 | TiN, TiB₂ | 46 | 0 | 1.4 |
| Comparative sample 10 | 53 | TiC, TiB₂ | 47 | 0 | 1.4 |

TABLE 4

| | Cubic boron nitride sintered body | | |
|---|---|---|---|
| | Maximum peak position 2θ(°) | | X-ray |
| Sample number | TiB₂ (101) plane | Ti compound (200) plane | diffraction intensity ratio $I_2/I_1$ |
| Invention sample 1 | 44.42 | 42.63 | 0.44 |
| Invention sample 2 | 44.38 | 42.52 | 0.52 |
| Invention sample 3 | 44.42 | 42.65 | 0.12 |
| Invention sample 4 | 44.35 | 42.48 | 0.50 |
| Invention sample 5 | 44.40 | 42.58 | 0.36 |
| Invention sample 6 | 44.47 | 42.67 | 0.53 |
| Invention sample 7 | 44.32 | 42.65 | 0.12 |
| Invention sample 8 | 44.38 | 42.13 | 0.41 |
| Invention sample 9 | 44.40 | 42.57 | 0.49 |
| Invention sample 10 | 44.41 | 42.64 | 0.22 |
| Comparative sample 1 | 44.42 | 42.47 | 0.54 |
| Comparative sample 2 | 44.43 | 42.65 | 0.10 |
| Comparative sample 3 | 44.37 | 42.46 | 0.52 |
| Comparative sample 4 | 44.38 | 42.60 | 0.30 |
| Comparative sample 5 | 44.33 | 42.64 | 0.23 |
| Comparative sample 6 | 44.35 | 42.63 | 0.22 |
| Comparative sample 7 | 44.48 | 42.60 | 0.65 |
| Comparative sample 8 | 44.12 | 42.58 | 0.38 |
| Comparative sample 9 | 44.32 | 42.63 | 0.03 |
| Comparative sample 10 | 44.38 | 41.97 | 0.37 |

* "Ti compound" in this table represents TiN, TiC, or TiCN.

Preparation of Cutting Tool

The obtained cubic boron nitride sintered body was cut out so as to correspond to the insert-shaped tool shape defined in the ISO standard CNGA 120408 using an electric discharge machine. The cut-out cubic boron nitride sintered body was joined to a cemented carbide base metal via brazing. The brazed tool was honing-processed to obtain a cutting tool.

Cutting Test

By using the obtained cutting tools, a cutting test was performed under the following conditions.
 Work material: SCM 415 carburized and hardened steel (HRC 60)
 Work material shape: Round bar, φ 80 mm×200 mm,
 Processing method: Outer diameter cutting,
 Cutting speed: 150 m/min,
 Feed: 0.15 mm/rev,
 Depth of cut: 0.15 mm,
 Coolant: used (waterborne coolant),
 Evaluation items: the tool life was defined as when the width of the flank wear or the width of the corner wear reached 0.15 mm, or when a cutting tool was fractured, and the processing time to the tool life was measured. Table 5 shows the measurement results.

TABLE 5

| | Cutting test | |
|---|---|---|
| Sample number | Processing Time (min.) | Damage form |
| Invention sample 1 | 62 | Normal wear |
| Invention sample 2 | 68 | Normal wear |
| Invention sample 3 | 58 | Normal wear |
| Invention sample 4 | 59 | Normal wear |
| Invention sample 5 | 65 | Normal wear |
| Invention sample 6 | 60 | Normal wear |
| Invention sample 7 | 63 | Normal wear |
| Invention sample 8 | 58 | Normal wear |
| Invention sample 9 | 65 | Normal wear |
| Invention sample 10 | 60 | Normal wear |
| Comparative sample 1 | 7 | Fractured |
| Comparative sample 2 | 40 | Normal wear |
| Comparative sample 3 | 44 | Normal wear |
| Comparative sample 4 | 18 | Fractured |
| Comparative sample 5 | 39 | Normal wear |
| Comparative sample 6 | 38 | Normal wear |
| Comparative sample 7 | 35 | Normal wear |
| Comparative sample 8 | 46 | Normal wear |
| Comparative sample 9 | 13 | Fractured |
| Comparative sample 10 | 47 | Normal wear |

As is recognized from the results indicated in Table 5, cutting tools produced form the cubic boron nitride sintered bodies of the invention samples showed better wear resistance and fracture resistance than cutting tools produced from the cubic boron nitride sintered bodies of the comparative samples and showed longer tool life.

Example 2

Next, as indicated in Table 6, ion bombardment processing was applied to the surfaces of the cubic boron nitride sintered bodies of invention samples 2, 3, 6, and 7 obtained in Example 1, and coating layers were formed by an arc ion plating method. When a first layer and a second layer were formed, these layers were formed on the surface of the cubic boron nitride sintered body in the stated order. The processing conditions were as described below. The compositions and average thicknesses of the coating layers were as listed in the following Table 6.

Condition of Ion Bombardment Processing
 Substrate temperature: 500° C.
 Pressure: Ar gas atmosphere at 2.7 Pa
 Voltage: −400 V
 Current: 40 A
 Time: 30 minutes
Coating Layer Formation Condition
 Substrate temperature: 500° C.
 Pressure: nitrogen (N₂) gas atmosphere at 3.0 Pa (for nitride layer), or a mixed gas atmosphere of nitrogen (N₂) gas and acetylene (C₂H₂) gas at 3.0 Pa (for carbonitride layer)
 Voltage: −60 V
 Current: 120 A

TABLE 6

| Sample number | Cubic boron nitride sintered body | Coating layer | | | | Average thickness of the entire coating layer (μm) |
|---|---|---|---|---|---|---|
| | | First layer | | Second layer | | |
| | | Composition | Average thickness (μm) | Composition | Average thickness (μm) | |
| Invention sample 11 | Invention sample 2 | TiCN | 1.0 | — | | 1.0 |
| Invention sample 12 | Invention sample 2 | TiAlN | 1.0 | — | | 1.0 |
| Invention sample 13 | Invention sample 2 | TiN | 0.2 | TiCN | 0.8 | 1.0 |
| Invention sample 14 | Invention sample 2 | TiAlN | 0.2 | TiCN | 0.8 | 1.0 |
| Invention sample 15 | Invention sample 2 | TiCN | 5.0 | — | | 5.0 |
| Invention sample 16 | Invention sample 2 | TiAlN | 5.0 | — | | 5.0 |
| Invention sample 17 | Invention sample 2 | TiN | 0.5 | TiCN | 4.5 | 5.0 |
| Invention sample 18 | Invention sample 2 | TiAlN | 0.5 | TiCN | 4.5 | 5.0 |
| Invention sample 19 | Invention sample 3 | TiCN | 5.0 | — | | 5.0 |
| Invention sample 20 | Invention sample 3 | TiAlN | 5.0 | — | | 5.0 |
| Invention sample 21 | Invention sample 3 | TiN | 0.5 | TiCN | 4.5 | 5.0 |
| Invention sample 22 | Invention sample 3 | TiAlN | 0.5 | TiCN | 4.5 | 5.0 |
| Invention sample 23 | Invention sample 6 | TiCN | 5.0 | — | | 5.0 |
| Invention sample 24 | Invention sample 6 | TiAlN | 5.0 | — | | 5.0 |
| Invention sample 25 | Invention sample 6 | TiN | 0.5 | TiCN | 4.5 | 5.0 |
| Invention sample 26 | Invention sample 6 | TiAlN | 0.5 | TiCN | 4.5 | 5.0 |
| Invention sample 27 | Invention sample 7 | TiCN | 5.0 | — | | 5.0 |
| Invention sample 28 | Invention sample 7 | TiAlN | 5.0 | — | | 5.0 |
| Invention sample 29 | Invention sample 7 | TiN | 0.5 | TiCN | 4.5 | 5.0 |
| Invention sample 30 | Invention sample 7 | TiAlN | 0.5 | TiCN | 4.5 | 5.0 |

*In the table, "—" means that no layer is formed.

A cutting test of a coated cubic boron nitride sintered body provided with a coating layer on the surface was performed similarly to Example 1. The following Table 7 shows the results.

TABLE 7

| | Cutting test | |
|---|---|---|
| Sample number | Processing Time (min.) | Damage form |
| Invention sample 11 | 72 | Normal wear |
| Invention sample 12 | 72 | Normal wear |
| Invention sample 13 | 70 | Normal wear |
| Invention sample 14 | 74 | Normal wear |
| Invention sample 15 | 88 | Normal wear |
| Invention sample 16 | 85 | Normal wear |
| Invention sample 17 | 83 | Normal wear |
| Invention sample 18 | 92 | Normal wear |
| Invention sample 19 | 85 | Normal wear |
| Invention sample 20 | 82 | Normal wear |
| Invention sample 21 | 78 | Normal wear |
| Invention sample 22 | 88 | Normal wear |
| Invention sample 23 | 84 | Normal wear |
| Invention sample 24 | 84 | Normal wear |
| Invention sample 25 | 81 | Normal wear |
| Invention sample 26 | 86 | Normal wear |
| Invention sample 27 | 92 | Normal wear |
| Invention sample 28 | 94 | Normal wear |
| Invention sample 29 | 90 | Normal wear |
| Invention sample 30 | 98 | Normal wear |

As is recognized from the results indicated in Table 7, the coated cubic boron nitride sintered body provided with a coating layer on the surface thereof (invention samples 11 to 30) had better wear resistance than the cubic boron nitride sintered body without a coating layer (invention samples 1 to 10) and showed longer tool life.

INDUSTRIAL APPLICABILITY

The cubic boron nitride sintered body of the present invention can extend the tool life compared to conventional ones due to excellent wear resistance and excellent fracture resistance, and is highly industrially applicable in that point.

What is claimed is:

1. A cubic boron nitride sintered body comprising cubic boron nitride and a binder phase, wherein
    a content of the cubic boron nitride is 40 volume % or more and 70 volume % or less;
    a content of the binder phase is 30 volume % or more and 60 volume % or less;
    an average particle size of the cubic boron nitride is 0.1 µm or more and 3.0 µm or less;
    the binder phase contains TiN and/or TiCN, and $TiB_2$ and contains substantially no Al;
    a (101) plane of $TiB_2$ in the binder phase shows a maximum peak position (2θ) in X-ray diffraction of 44.2° or more; and
    $I_2/I_1$ is 0.10 or more and 0.55 or less, where $I_1$ denotes an X-ray diffraction intensity of a (111) plane of the cubic boron nitride and $I_2$ denotes an X-ray diffraction intensity of a (101) plane of $TiB_2$ of the binder phase.

2. The cubic boron nitride sintered body according to claim 1, wherein a (200) plane of Ti compounds (provided that $TiB_2$ is excluded) in the binder phase shows a maximum peak position (2θ) in X-ray diffraction of 42.1° or more.

3. A coated cubic boron nitride sintered body comprising the cubic boron nitride sintered body according to claim 1 and a coating layer formed on a surface of the cubic boron nitride sintered body.

4. The coated cubic boron nitride sintered body according to claim 3, wherein an average thickness of the entire coating layer is 0.5 µm or more and 6.0 µm or less.

5. A coated cubic boron nitride sintered body comprising the cubic boron nitride sintered body according to claim 2 and a coating layer formed on a surface of the cubic boron nitride sintered body.

6. The coated cubic boron nitride sintered body according to claim 5, wherein an average thickness of the entire coating layer is 0.5 µm or more and 6.0 µm or less.

* * * * *